(12) United States Patent
Ciccaglione et al.

(10) Patent No.: US 8,465,248 B2
(45) Date of Patent: Jun. 18, 2013

(54) APPARATUS AND METHOD FOR MOVING HEAVY EQUIPMENT

(75) Inventors: Terry M. Ciccaglione, Cold Spring, NY (US); Charles C. Gange, Rhinebeck, NY (US); R. Kevin Qualters, LaGrangeville, NY (US); Terese Sharon Spaulding, Highland, NY (US); Todd D. Voltz, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 12/481,075

(22) Filed: Jun. 9, 2009

(65) Prior Publication Data

US 2010/0310345 A1 Dec. 9, 2010

(51) Int. Cl.
*B66F 9/00* (2006.01)

(52) U.S. Cl.
USPC ........... 414/787; 414/769; 414/778; 414/779; 220/263; 269/43; 294/152

(58) Field of Classification Search
USPC .. 414/754, 768, 769, 778, 779, 787; 294/152; 269/43; 220/263
See application file for complete search history.

(56) References Cited

U.S. PATENT DOCUMENTS

| | | | |
|---|---|---|---|
| 3,620,395 A * | 11/1971 | Farmer, Sr. | 414/816 |
| 5,584,635 A * | 12/1996 | Stapelmann | 414/11 |
| 5,688,011 A | 11/1997 | Gulley | |
| 6,039,376 A | 3/2000 | Lopreiato | |
| 6,755,478 B2 | 6/2004 | Messinger-Rapport | |
| 6,857,836 B2 | 2/2005 | Keller | |
| 7,014,413 B2 * | 3/2006 | Young | 414/743 |
| 7,080,814 B1 | 7/2006 | Brooks | |
| 7,150,598 B2 | 12/2006 | Smets et al. | |
| 7,419,198 B2 * | 9/2008 | Baker et al. | 294/74 |
| 8,016,335 B2 * | 9/2011 | McKay | 294/152 |
| 8,177,472 B2 * | 5/2012 | Charlier et al. | 414/782 |
| 2003/0136807 A1 | 7/2003 | Falzone et al. | |
| 2005/0279791 A1 | 12/2005 | Komorowski | |

* cited by examiner

*Primary Examiner* — Scott Lowe
(74) *Attorney, Agent, or Firm* — Lieberman & Brandsdorfer, LLC (57) ABSTRACT

An apparatus and method to lift a carrier housing an object onto a secondary unit. The carrier is connected to the secondary unit, configured to rotate about an axis. A tether is provided with at least two branches on one end, and a single branch on a second end. The two branches are secured to the carrier in a spaced relationship, such that a pull of the single branch rotates the carrier about the axis and places the carrier on the base unit.

16 Claims, 7 Drawing Sheets

FIG. 9

APPARATUS AND METHOD FOR MOVING HEAVY EQUIPMENT

BACKGROUND OF THE INVENTION

1. Technical Field

This invention relates to an apparatus and system for assisting in the move and installation of equipment. More specifically, the invention relates to sensitive electrical equipment and a method for assisting with the uprighting and positioning of the equipment while mitigating damage thereto.

2. Description of the Prior Art

It is recognized that various forms of equipment are periodically moved from a first location to a second location. Movement may be required for various reasons, including relocation of an office, shipment of equipment to or from an office, etc. Some equipment is rather small in size and therefore easier to move. Other equipment is large in size, and therefore more difficult to move. However, size is not the only factor that is addressed in the movement of articles. For example, the article subject to movement may be fragile or otherwise sensitive, without respect to size. It is recognized that fragile articles are commonly wrapped in a protective layer to address the sensitivity of the product during shipment. Smaller articles can be carried in a container.

Issues do arise with larger sensitive articles and shipment thereof. More specifically, the larger article can be enveloped in a protective layer to address the sensitivity during shipment thereof. However, the protective layer does not address movement of the larger article. It is known in the art that larger articles may be placed on pallets and moved with wheeled mechanical objects. But, this does not address the sensitivity associated with the article. More specifically, the known movement of larger articles does not address placement of the sensitive article onto the pallet.

There are two primary concerns that need to be addressed with movement of the larger and sensitive articles, including mitigating injury to both the article and the mover. It is desirable that the solution enable a single mover to be able to move the larger article onto a pallet by a mechanical assembly. This solution would reduce costs of added labor.

Therefore, there is a need for a solution that addresses movement of heavy component that mitigates the opportunity for damage to both the component being moved and the person employed to move the component.

SUMMARY OF THE INVENTION

This invention comprises a process and tool for changing the orientation of a large component.

In one aspect of the invention, a method is provided for assisting with the installation of equipment. An object to be lifted is placed in a carrier, wherein the carrier has a bottom wall and at least one side wall. A base unit is provided with a bottom surface and a hinged platform, wherein the hinged platform is attached to the bottom wall of the carrier. The carrier is lifted onto the base unit by rotating the hinged platform from an open position to a closed position through use of a hinge in communication with the platform to support the rotation. As part of the lift process, a tether in communication with the carrier is leveraged to raise the carrier onto the hinged platform while maintaining the stability of the carrier. The tether includes a distal end with at least two branches with each of the branches in communication with the at least one side wall of the carrier in spaced relationship.

In another aspect of the invention, an apparatus is provided to assist in the installation of equipment from a carrier to a base unit. The carrier is provided to house an object to be lifted, and includes a bottom wall and at least one side wall. The base unit is provided with a bottom surface and a hinged platform. An attachment element attaches the hinged platform of the base unit to the bottom wall of the carrier. In addition to the carrier and base unit, a tether is provided to lift the carrier onto the base unit. The tether is provided with a distal end having at least two separate branches, with each branch in separate communication with at least one wall of the carrier. Actuation of an oppositely position proximal end of the tether rotates the hinged platform from an open position to a closed position through use of a hinge in communication with the platform. The actuation of the tether raises the carrier onto the hinged platform, while the space between the separately position branches provides for carrier stability.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT(s)

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of mechanical apparatus, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The carrier is employed to house equipment when lifting the equipment from a horizontal position to a vertical position. There are three primary components to the system that support the objectives of the safe and steady lifting of the object retained within the carrier, including a base unit, the carrier, and a strap in communication with the carrier. The base unit with a properly placed strap handle supports proper leveraging and rotation of the carrier through use of the strap to steadily rotate the object onto the base unit in a manner that facilitates incorporation of the object into an operating position. Accordingly, a carrier in combination with a base unit and a strap is provided to safely and steadily lift an object from a horizontal position to a vertical position.

Technical Details

A system for assisting in the installation of equipment is described with referenced to FIGS. 1-8, and an associated method is described with reference to FIG. 9. There are three primary components to the system, including the carrier which houses an object to be installed, a base unit, and a strap. In some embodiments, the system for assisting in the positioning and installation of the carrier may be comprised of all three components, but is not so limited. Similarly, in one embodiment, all three components may be employed with a different configuration to support the rotation of the carrier onto the base unit. Accordingly, the three primary components may be employed with additional elements and/or with a different configuration to support a steady rotation of the carrier into the base unit.

Figure 1:
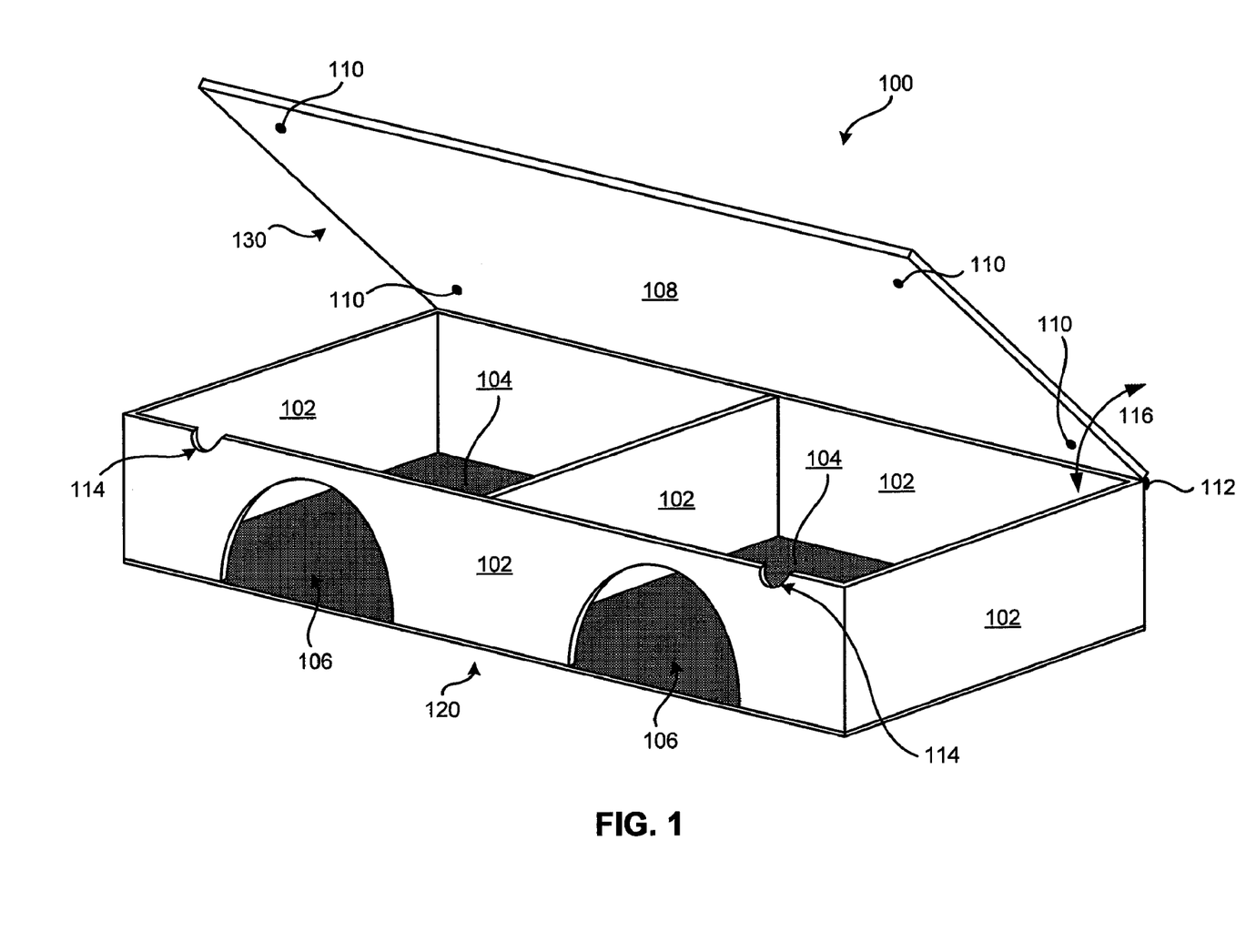
FIG. 1 is a schematic diagram of a base unit employed to tilt an object according to one embodiment.

With reference to FIG. 1, a system for installing equipment is described according to one embodiment. More specifically, FIG. 1 illustrates a base unit (100) employed to tilt a carrier from a first position to a second position. The base unit (100) has a lower portion (120) and an upper portion (108). The lower portion (120) includes at least an interior floor (104) and a plurality of supporting walls (102). More specifically, the supporting walls (102) are shown as exterior walls about the perimeter of the unit that extend the height of the unit, with one of the supporting walls (102a) being an interior wall dividing the interior of the carrier into two separate compartments. In one embodiment, the carrier may be configured without supporting wall (102a), such that the interior of the carrier has a single interior compartment. Similarly, in one embodiment, additional supporting walls (102) and/or additional interior walls (102a) may be included to support additional weight, ease of construction, increased stability, etc. Each supporting wall (102) has a height equal to the height of the base unit (100). In one embodiment, the height of the base unit (100) is about the height of a carrier (not shown) prior to rotation, as described in FIG. 8. Similarly, in one embodiment, the interior wall (102a) has a height equal to the height of supporting walls (102). However, in another embodiment, the interior wall (102a) may be sized to be a height less than the height of supporting walls (102).

The supporting walls (102) form an interior compartment for the base unit (100) having the interior floor (104). The base unit also includes an upper portion (130) having a surface (108). In one embodiment, the surface (108) is a substantially flat planar surface. The upper portion (130) is coupled to the lower portion (120) along an edge. In one embodiment, a hinge (112) is employed as a coupling mechanism for the upper portion (130) and the lower portion (120). Similarly, in one embodiment, the hinge (112) is a piano-style hinge. The upper portion (130) may be coupled to the lower portion (120) in many other ways, including but not limited to, at least two hinges, clamps, flexible material, etc.

The interior floor (104) is shown herein with at a first aperture (114) positioned adjacent to an upper area of the supporting wall (102). More specifically, first aperture (114) is an aperture formed along a portion of the supporting wall (102) that is in communication with the surface (108) when it encloses the base unit (100). In one embodiment, the aperture (114) is configured and sized to receive finger placement. At least one second aperture (106) is shown adjacent to a lower area of the supporting wall (102), which is referred to as an aperture. In one embodiment, the foot aperture (106) is larger than the first aperture (114) as the foot aperture (106) is sized to receive a foot, and the first aperture (114) is sized to receive one or more fingers, which generally occupies less space than a foot. More specifically, the first aperture (114) is provided to assist in access to the underside of upper portion (130), such as when surface (108) is in a closed position that encloses the base unit (100). In one embodiment, one or more connectors (110) are provided for coupling the carrier to the upper portion (130) prior to lifting the carrier. The connector (110) may come in various different forms, including but not limited to, a hole, a groove, a fastener, and a bracket. Once the carrier is lifted onto the enclosed base unit (100), the first aperture serves as an access point to remove one or more of the connectors (110).

Figure 2:
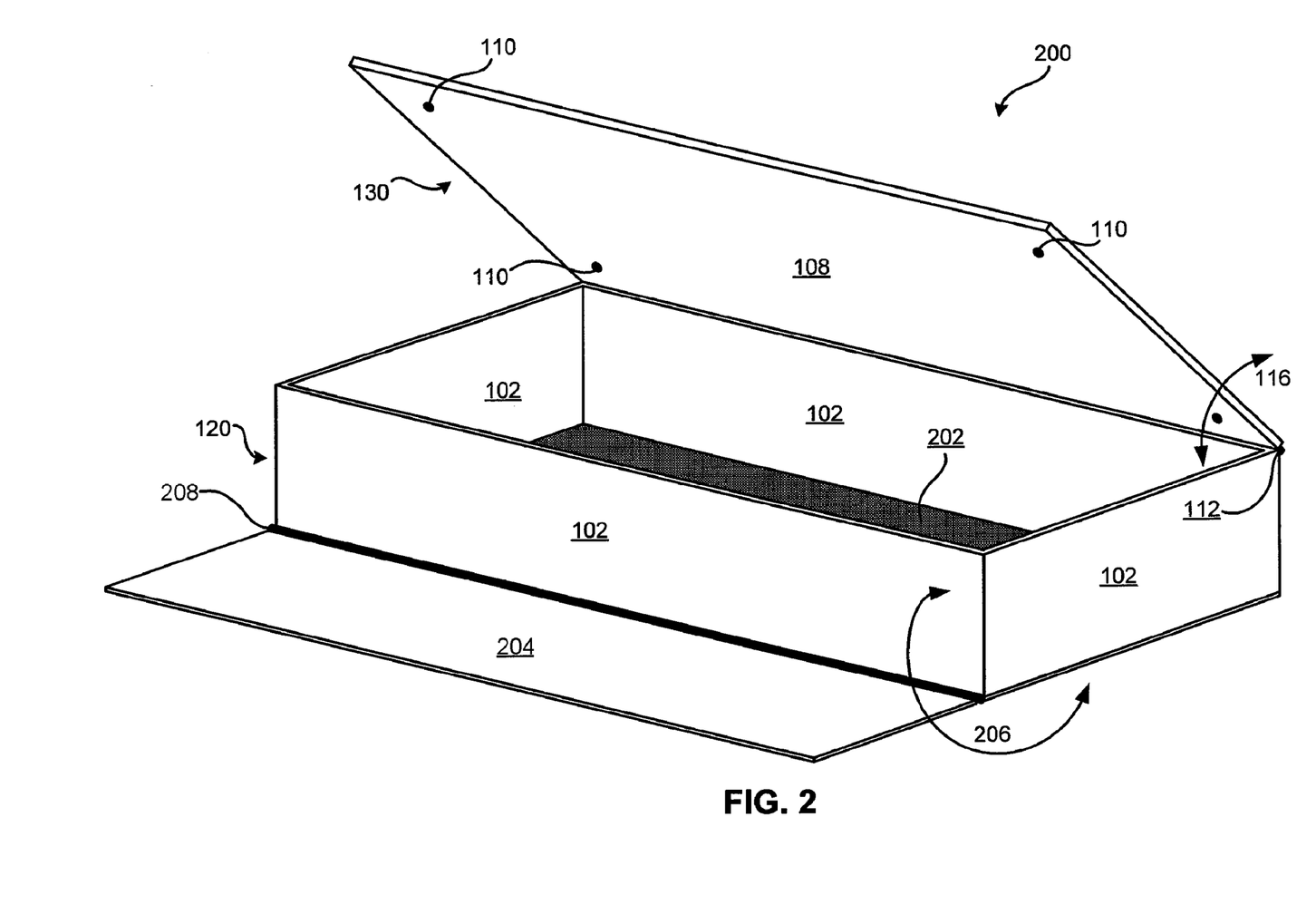
FIG. 2 is a schematic diagram of a base unit employed to tilt an object according to another embodiment.

Referring to FIG. 2, another form of the base unit (100) is disclosed. More specifically, the modified base unit (200) is configured with a foot plate (204) coupled to one of the walls (102) of the lower portion (120) of the body of the base unit. As shown herein, the foot plate (204) is located on an opposite side wall (102) from the hinge (112). The foot plate (204) is coupled to the modified base unit (200). In one embodiment, the coupling element may be in the form of a hinge (208). The foot plate (204) is adjustable between angles parallel to one of the supporting walls (102) to an angle perpendicular to the supporting wall (102) about a hinge (204), as represented by arrow (206). In one embodiment, the front side wall (102) adjacent to the foot plate (204) does not include a foot cutout (106), as the foot plate (204) is provided as a replacement for this embodiment.

Figure 3A:
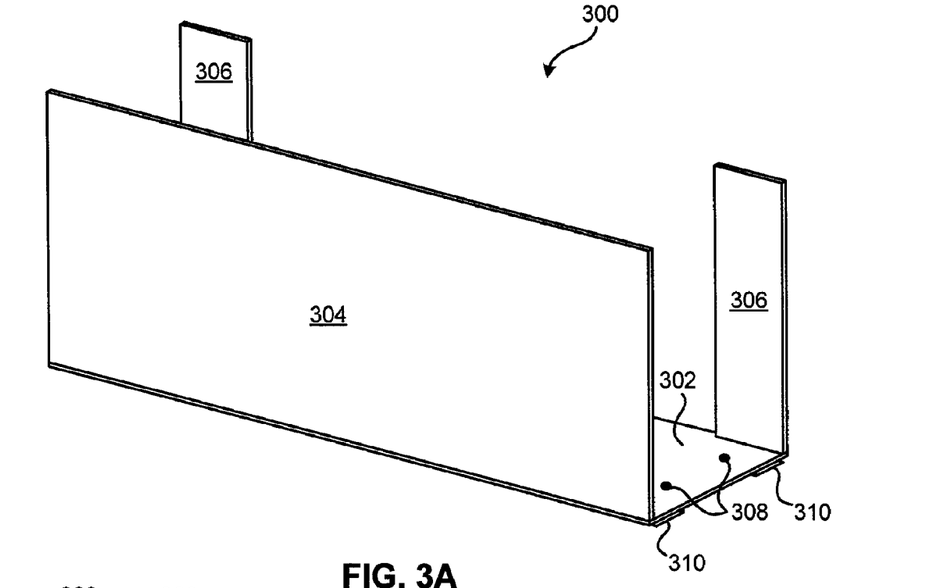
FIG. 3A is a perspective view of a carrier.
Figure 3B:
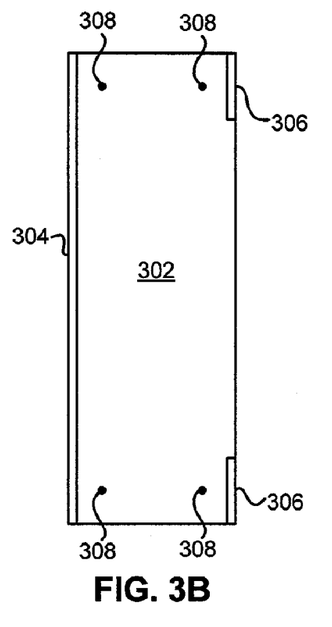
FIG. 3B is a top view of the carrier from FIG. 3A.
Figure 3C:
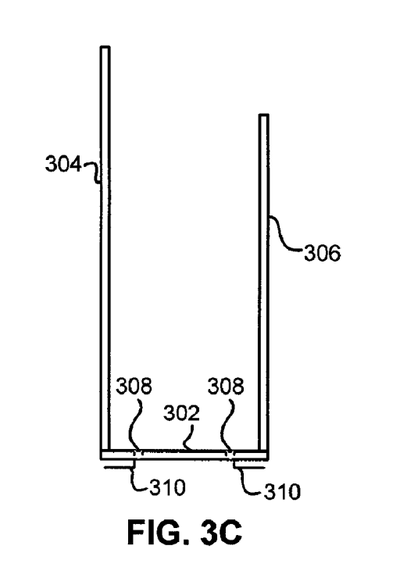
FIG. 3C is a side view of the according from FIG. 3A.

The carrier shown in FIGS. 1 and 2 are configured to facilitate the rotation and lifting of an object housed within a carrier about an axis. FIGS. 3A-3C illustrated the elements of the carrier portion of the system, wherein FIG. 3A is a perspective view of the carrier, FIG. 3B is a top view of the carrier, and FIG. 3C is a side view of the carrier. The carrier (300) shown herein is one form of the carrier, and in one embodiment, the carrier may come in different shapes and sizes. A bottom planar surface (302) is provided with two perpendicular members (304) and (306) on either side that extend from the bottom surface at an angle normal to the bottom surface (302). In one embodiment, the carrier (300) is employed to hold a heavy object. At least one connector (308) is provided to couple the bottom surface (302) of the carrier (300) to surface (108) of the base unit (100). The connector (308) may be in the form of a hole, groove, fastener, bracket, etc. The attachment of the carrier (300) to the leveraging apparatus is shown in detail below in FIG. 4. In one embodiment, the carrier (300) is provided with a grooved device (310) for removably coupling the carrier (300) with surface (108). The grooved device (310) may engage with a complementary grooved device coupled to (130) of the base unit (100). Similarly, in one embodiment, the complementary grooved devices of the carrier (300) and the base unit (100) may slide together to form a secure coupling between the base unit surface (108) and carrier surface (302).

In another embodiment, the carrier (300) may include an adjustable element coupling perpendicular member (304) to the surface (302) for adjusting the position of the member (304) relative to the position of perpendicular member (306). This embodiment is particularly useful for lifting objects within the carrier that do not have a dimension that fits within the defined spaced between members (304) and (306). For example, in one embodiment, a server may have a profile narrower than the spacing between members (304) and (306). The coupling enables member (304) to be moved closer to member (306) for securely engaging the server housed within the confines of the walls of the carrier.

Figure 4:
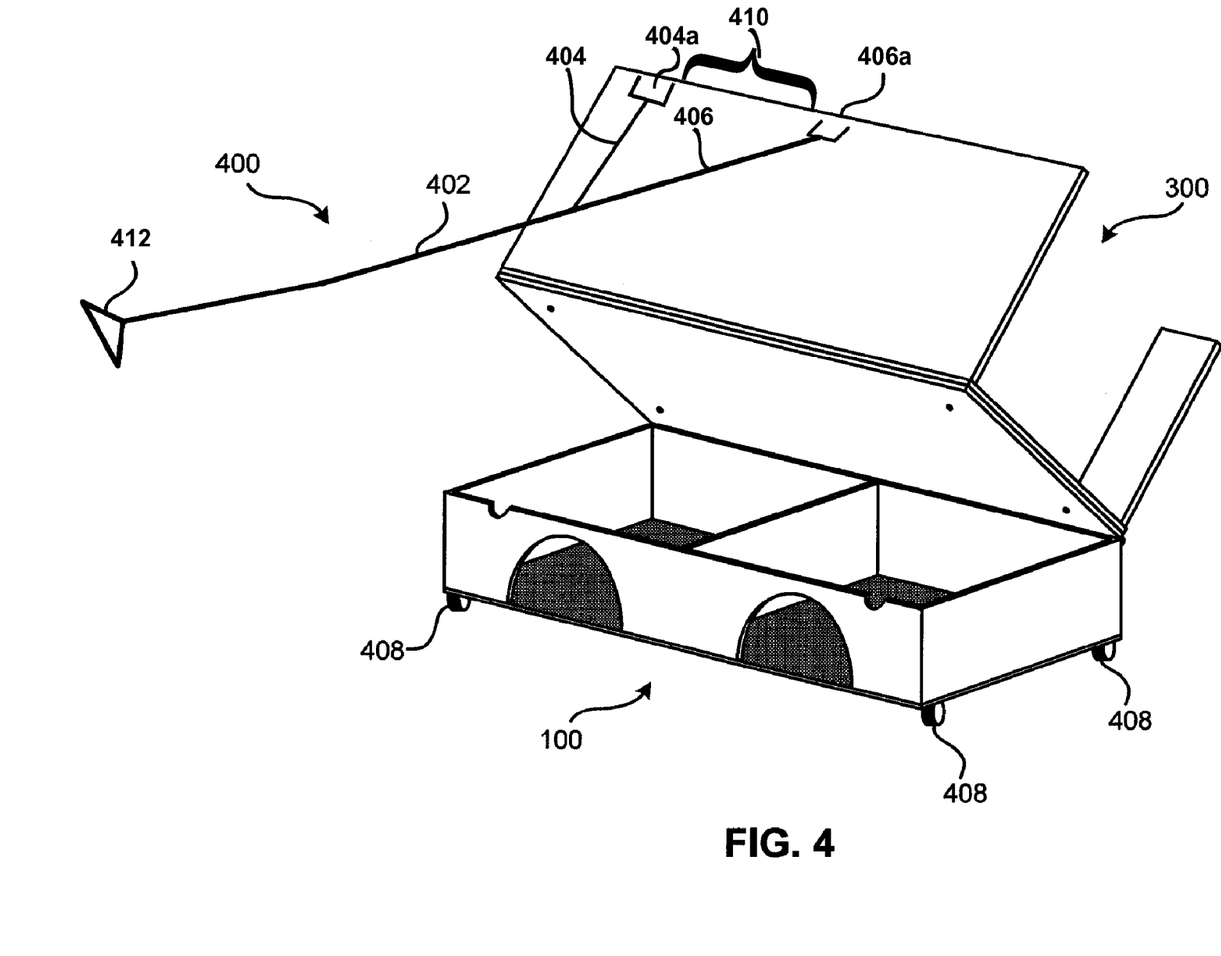
FIG. 4 is a schematic diagram of a base unit in communication with the carrier for rotating the carrier into position.

FIG. 4 is a schematic diagram (400) of the carrier in a tilt position with respect to the base unit. As shown, a strap (402) is provided with a fork at one end forming at least two branches (404) and (406) with a clip or other attachment device at a distal end of each branch, and a handle (412) at the opposite end of the strap (402). The strap may come in a variety of materials, including but not limited to, Cordura, nylon, rope, chain, etc. More specifically, branch (404) has attachment device (404a) and branch (406) has attachment device (406a). Each of the attachment devices (404a) and (406a) are in communication with a top portion of the wall (304) of the carrier (300). A spacing (410) is provided between the two attachment devices (404a) and (406a). This spacing spreads the force that is exerted upon the carrier (300) during the lifting process. In one embodiment, the attachment devices (404a) and (406a) may be in the form of a bracket, D-ring, clamp, hole, or any other connector as would be known to one of ordinary skill in the art. As shown, the carrier (300) is in a tilted position at an angle about half way between a horizontal position and a vertical position with respect to the base unit (100). Accordingly, the distribution of the force exerted on the carrier provides stability to the carrier (300).

As further shown in FIG. 4, the bottom surface of the base unit (100) may includes one or more wheels (408) to facilitate movement of the base unit (100) on a secondary surface. The wheels may be formed of any material and be of any style as would be known to one of ordinary skill in the relevant art. Furthermore, in one embodiment, the wheels (408) may include a locking component, such that when the carrier (300) is positioned relative to the base unit (100), the base unit (100) will remain stationary until the wheels (408) are unlocked.

Figure 5A:
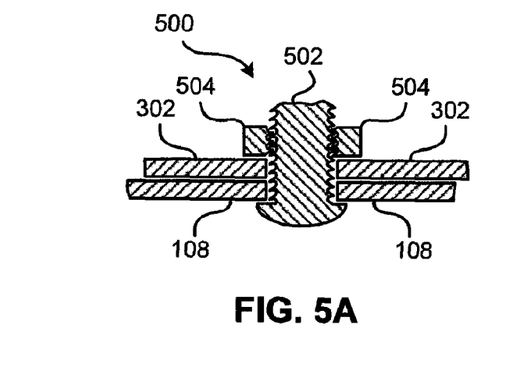
FIG. 5A is a cross section of a fastener according to one embodiment.
Figure 5B:
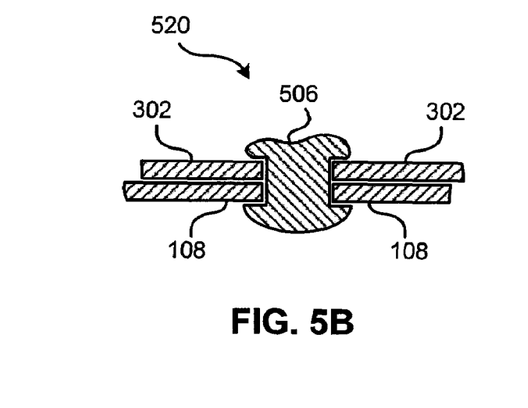
FIG. 5B is a cross section of a fastener according to one embodiment.

Now referring to FIGS. 5A-5F, connectors are shown according to several embodiments. The connectors may be used to couple the upper portion (108) of the base unit (100) to the surface (302) of the carrier (300). In FIG. 5A, a connector (510) is shown where a hole is positioned on the upper portion (108) and the surface (302), such that a bolt (502) and nut (504) may be used to couple the surfaces together. In one embodiment, other fasteners may be used to couple the two surfaces together, including but not limited to, a rivet (506) as shown in FIG. 5B. Other exemplary forms of fasteners may include brads, screws, nails, etc. Similarly, in one embodiment, the fastener may be inserted from the opposite direction as that shown herein and providing the same couple effect.

Figure 5C:
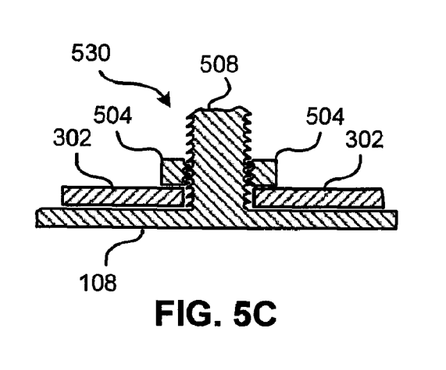
FIG. 5C is a cross section of a fastener according to one embodiment.
Figure 5D:
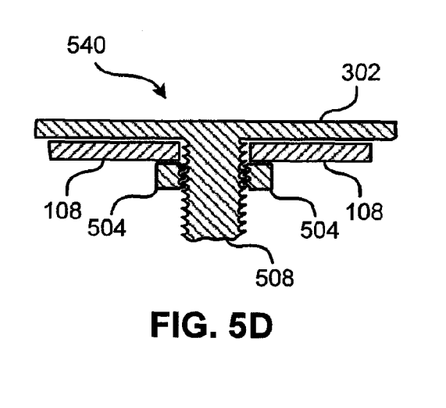
FIG. 5D is a cross section of a fastener according to one embodiment.

In FIGS. 5C and 5D, another connector is shown where a member (508) extends from one surface to either the upper portion (108) of the base unit (100) or the surface (302) of the carrier (300) and a nut (504) is used to couple the surfaces together. In one embodiment, other forms of fasteners may be employed such that a member extends from one surface and fits into and projects through an opening on the other surface, and then accommodates a securing element, including but not limited to a nut, pin, clamp, etc.

Figure 5E:
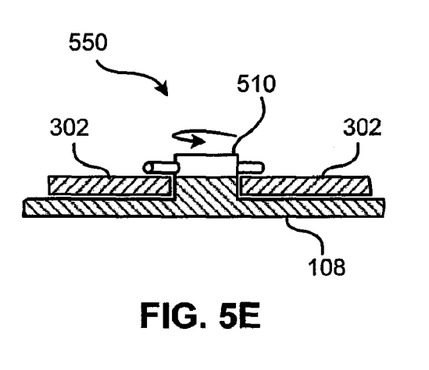
FIG. 5E is a schematic diagram of a fastener according to one embodiment.
Figure 5F:
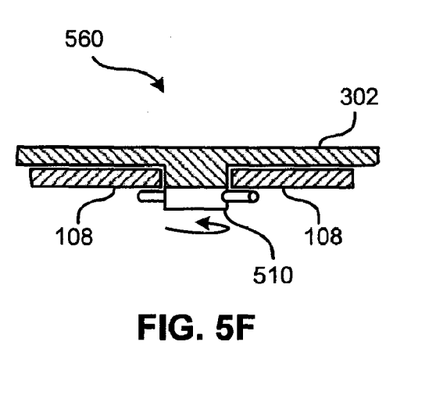
FIG. 5F is a schematic diagram of a fastener according to one embodiment.

FIGS. 5E and 5F show another connector where a member (510) extends from one surface, to either the upper portion (108) of the base unit (100) or the surface (302) of the carrier (300), and is formed such that it can affect the coupling without any additional hardware. For example, as shown, member (510) has an extended portion, which when rotated locks against the other surface affecting the coupling. In such embodiments, the hole in the second surface is formed such that the extended portion can fit through the hole in one orientation, but not in another orientation.

Figure 6:
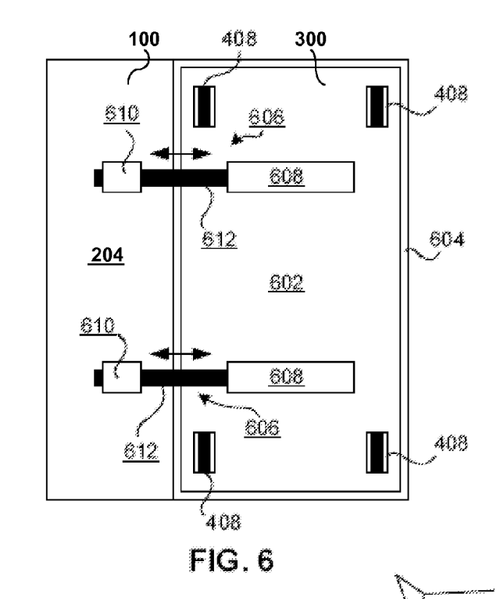
FIG. 6 is a schematic diagram of the bottom of a base unit according to one embodiment.

FIG. 6 is a bottom view (600) of the base unit (100). In this view, a foot plate (204) is coupled to the lower portion of the base unit (100). To compensate for movement of the individual pieces of the base unit (100) during lifting, one or more locking mechanisms (606) may be employed to secure the foot plate (204). In one embodiment, the locking mechanism (606) may include a first sleeve (608) on the bottom portion (602) of the base unit (100) and a second sleeve (610) on the bottom portion of the foot plate (204), with a sliding member (612) extendable between the two sleeves (608) and (610). Also shown herein, wheels (408) may be located near the corners of the bottom portion (602) and an edging (604) may extend around the outside of the bottom portion (602) so as to provide more support to the apparatus to be lifted onto the base unit (100).

In one embodiment, a foot plate (204) may slide out of a sleeve on the bottom portion (602) of the base unit (100). This allows a user to selectively use the foot plate for support and stability when tilting objects, and does not require a separate hinge to attach to the foot plate, or cutouts for access to the footplate inside of the supporting walls.

Figure 7:
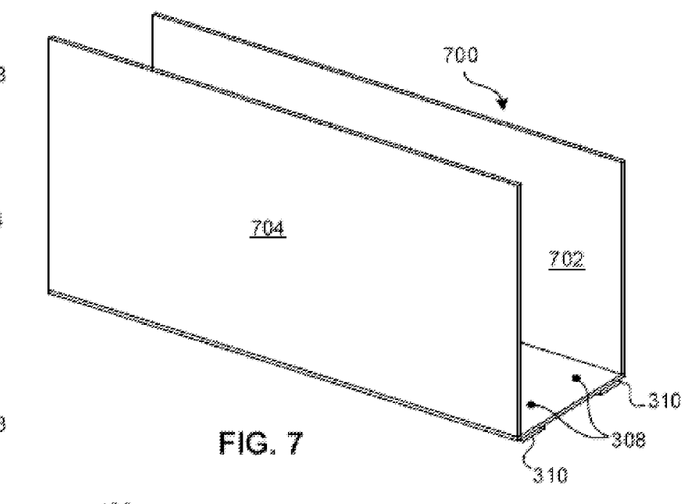
FIG. 7 is a schematic diagram of a carrier according to one embodiment.

FIG. 7 is a perspective view of a carrier (700) according to one embodiment, including a first member (704) and a second member (702). In one embodiment, the first and second members (704) and (702), respectively, have the same relative size and shape. Conversely, in one embodiment, the first and second member (704) and (702) may be sized differently. In addition, in one embodiment, the second member (702) may be adapted to fit under a component lying on its side on a supporting structure, as shown and described in FIG. 8.

Figure 8:
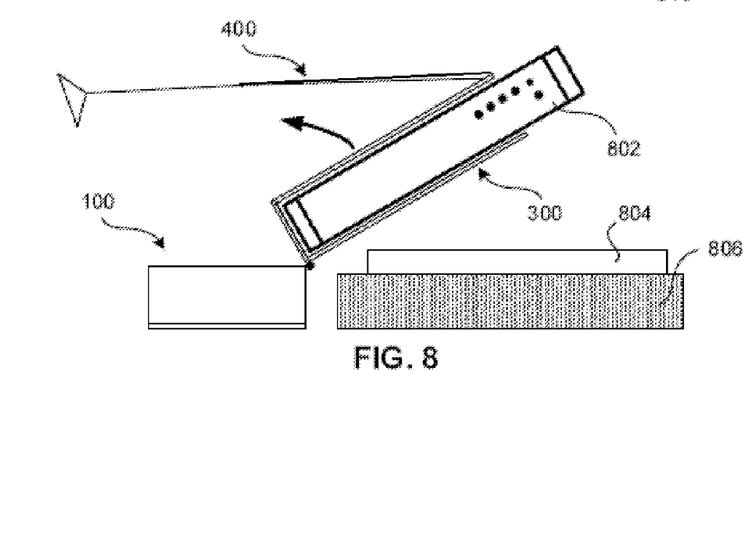
FIG. 8 is a schematic diagram of a strap in communication with a carrier for rotating the carrier onto the base unit.
Figure 9:
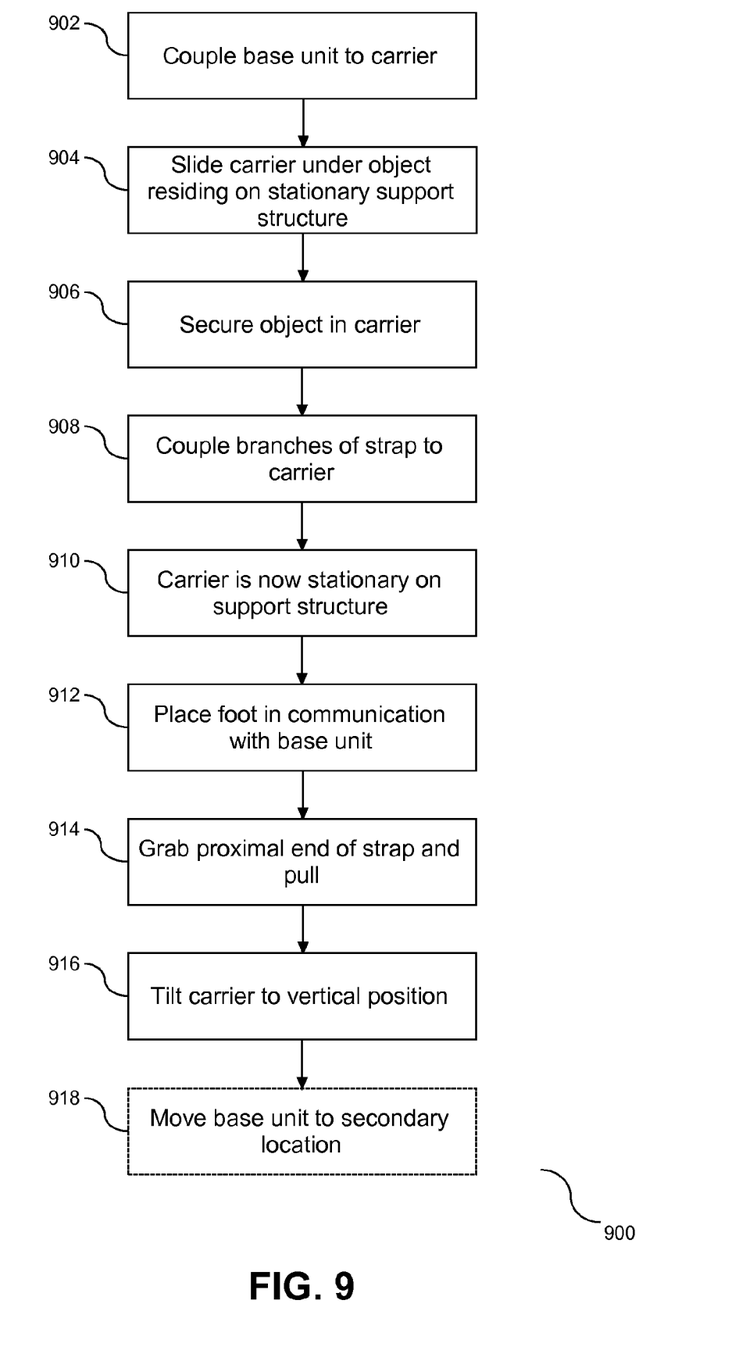
FIG. 9 is a flow chart illustrating a method for employing a strap for steadily rotating a carrier onto a base unit according to the preferred embodiment of this invention, and is suggested for printing on the first page of the issued patent.

FIG. 8 is a schematic view (800) of a base unit (100), a carrier (300), and a strap (400). The carrier (300) is shown housing a component (802) within an interior section of the carrier (300). The carrier (300) is coupled to the base unit (100), and the strap (400) is coupled to the carrier (300). The carrier (300) is in a tilted position with respect to a support structure (806). As shown, the top end of the upper portion of the base unit (100) is about the same height as the top of the support structure (806). Examples of a support structure include, but are not limited to, a pallet, a box, a carton, a crate, a housing, etc. As mentioned above, the second member of the carrier (300) may be sized to fit under the component (802) without altering the support structure (806) and/or packing materials (804), which may be included with the support structure (806). In one embodiment, the carrier (300) may be designed to fit into grooves provided in the packing material (804) such that it can slip into grooves and under the component (802) as it lies on a side surface.

The embodiments of FIGS. 1-8 each address the physical components of the system. FIG. 9 is a flow chart (900) illustrating the process in which the components are utilized to lift a carrier from a first position to a second position with respect to a base unit. There are three primary components employed for the leveraging process, including a base unit, a carrier, and a strap. Initially, an object is placed in the carrier and the base unit is coupled to the carrier (902). Following step (902), the carrier is slid under an object residing on the stationary support structure (904), and the object is secured in the carrier (906). A strap is provided with a first end and a second end, wherein the first end includes at least two branches and an attachment mechanism at the distal end of each branch. Each branch of the first end of the strap is coupled to the carrier in a spaced relationship (908). In one embodiment, each branch of the first end of the strap is coupled to perpendicular member (306). Each branch of the first end of the strap may be coupled to the carrier via a connector, such as a bracket, D-ring, clamp, hole, or any other connector as is known to one of skill in the art. Once placement of the branches of the first end of the strap is complete and prior to moving the position of the carrier and the housed component therein, the carrier is stationary on the support structure (910). Following step (910), the carrier is ready to be rotated. The person in communication with the second end of the strap places a foot in communication with the base unit (912). In one embodiment, the placement of the foot may be either on the foot plate (204) or in the cutout (106). Once the body of the person is in position, the second end of the strap is pulled (914). This pull action affects a tilt of the carrier from a horizontal position to a vertical position (916). The spaced relationship of the branches of the first end of the strap, together with the separate coupling of each branch to the carrier, provides stability to the carrier during the tilt and lift process. In one embodiment, the spacing between the two attachment elements of each branch provides added leverage for the tilting of the carrier for a large carrier. Once the carrier has been moved into position with respect to the base unit, the base unit may be moved to a secondary location (918). In one embodiment, the base unit is provided with one or more wheels to facilitate movement of the base unit to a secondary location. Accordingly, the base unit, carrier, and strap are employed to rotate and place the carrier on the top surface of the base unit in a manner that avoids a lift of the carrier.

As noted above, the top surface of the base unit is secured to the bottom surface of the carrier with one or more fastening elements. Once the carrier has been moved into position with respect to the base unit, the one or more connectors may be removed to detach the securing element between the carrier and the base unit. In one embodiment, the fastening elements are detached to enable the carrier to be placed in a destination in the rotated position. As discussed in detail above, the first aperture (114) is employed to detach the fastening element(s) without requiring movement of the carrier.

It is noted that the various features of the foregoing methodologies may be combined in various ways to create a plurality of combinations from the description presented above.

Advantages Over the Prior Art

The configuration of the base unit and carrier, together with the strap, provides a system that enables a carrier to be lifted onto the base unit with relative ease. In fact, the person pulling the strap is merely rotating the carrier about the axis of the connection of the base unit to the carrier. The system eliminates manual lifting and changing positions of the carrier.

Alternative Embodiments

It will be appreciated that, although specific embodiments of the invention have been described herein for purposes of illustration, various modifications may be made without departing from the spirit and scope of the invention. In particular, various components may be housed within the carrier, including but not limited to, an electrical component, a server, a power supply, a router, etc. Similarly, in one embodiment, a non-electrical or computer related component may be housed within the carrier. Additionally, the strap employed to lift and rotate the carrier has is shown with a proximal end and a distal end, wherein the proximal end is a single element and the distal end is provided with a branch. In one embodiment, the proximal end of the strap may be provided with a second handle to facilitate rotation of the carrier. Accordingly, the scope of protection of this invention is limited only by the following claims and their equivalents.

We claim:

1. A method for assisting in the installation of equipment comprising:
   placing an object to be lifted in a carrier, the carrier having a bottom wall and at least one side wall;
   a base unit with a bottom surface and a hinged platform, wherein,
   the hinged platform of the base unit is directly coupled to the bottom wall of the carrier; and
   lifting the carrier onto the base unit, including rotating the hinged platform from an open position to a closed position through use of a hinge in communication with the platform to support the rotation, and including leveraging a tether attached to the carrier for raising the carrier onto the hinged platform while maintaining the base unit stationary, the tether comprising a distal end with at least two branches and each of the branches in communication with the at least one side wall of the carrier.

2. The method of claim 1, further comprising sliding the raised carrier into a proper operating position within a multiple object system.

3. The method of claim 1, wherein the tether has a fork with at least two attachment points on the at least one side wall of the carrier.

4. The method of claim 3, further comprising supporting stability of the carrier during the lifting of the carrier onto the base unit by maintaining a distance between placement of the two attachment points on the at least one side wall of the carrier.

5. The method of claim 4, further comprising positioning a first handle secured to the tether opposite to the fork.

6. The method of claim 1, further employing a secondary securing element for attaching the hinged platform of the base unit to the bottom wall of the carrier.

7. The method of claim 6, further comprising a first aperture on a top side wall of the base unit for accessing an interior of the base unit for releasing the secondary securing element following the lifting of the carrier onto the base unit.

8. The method of claim 1, wherein the step of rotating the hinged platform from an open position to a closed position includes rotating the carrier by a 90 degree turn through a rotation of the top wall of the hinged platform around the axis of the hinge in response to the pulling of the tether.

9. The method of claim 1, further comprising a second aperture on a bottom side wall of the hinged platform and placing a foot of a person pulling the tether in the second aperture for facilitating the lifting of the carrier onto the base unit.

10. An apparatus to assist in the installation of equipment comprising:
 a carrier to house an object to be lifted, the carrier having a bottom wall and at least one side wall;
 a base unit with a bottom surface and a hinged platform;
 an attachment element to attach the hinged platform of the base unit to the bottom wall of the carrier, wherein the hinged platform of the base unit is directly coupled to the bottom wall of the carrier; and
 a tether to lift the carrier onto the base unit, including rotation of the hinged platform from an open position to a closed position through use of a hinge in communication with the platform to support the rotation, the tether comprising a distal end with at least two separate branches with each branch in separate communication with the at least one side wall of the carrier, and including actuation of a proximal end of the tether to raise the carrier onto the hinged platform while maintaining the base unit stationary.

11. The apparatus of claim 10, further comprising a first handle on the tether, the first handle secured to a branch opposite to the fork.

12. The apparatus of claim 11, wherein the carrier is lifted by pulling the handle away from the base unit.

13. The apparatus of claim 10, further a secondary securing element to attach the hinged platform of the base unit to the bottom wall of the carrier.

14. The apparatus of claim 13, further comprising a first aperture on a top side wall of the base unit to access an interior of the base unit to release the secondary securing element following lifting of the carrier onto the base unit.

15. The apparatus of claim 10, wherein rotation of the hinged platform from an open position to a closed position includes rotation of the carrier by a 90 degree turn through a rotation of the top wall of the hinged platform around the axis of the hinge in response to the pull of a strap.

16. The apparatus of claim 10, further comprising a second aperture on a bottom side wall of the hinged platform and placement of a foot of a person pulling a third tether in the second aperture to facilitate the lift of the carrier onto the base unit.

* * * * *